United States Patent [19]

Nishikawa

[11] Patent Number: 5,090,508

[45] Date of Patent: Feb. 25, 1992

[54] AUTOMOBILE SERVICING APPARATUS HAVING A TURNTABLE INCLUDING A RETRACTABLE LIFT

[76] Inventor: Koichi Nishikawa, 58, Komatsu-cho, Toyohashi-shi, Aichi-ken, Japan

[21] Appl. No.: 452,224

[22] Filed: Dec. 18, 1989

[30] Foreign Application Priority Data

Dec. 19, 1988 [JP] Japan .................. 63-318550

[51] Int. Cl.⁵ .................................. B60S 13/00
[52] U.S. Cl. ......................... 187/8.43; 187/8.54; 187/8.71
[58] Field of Search ........... 187/8.41, 8.43, 8.74, 187/8.71, 8.72, 8.62, 8.61; 254/122

[56] References Cited

U.S. PATENT DOCUMENTS

| | | | |
|---|---|---|---|
| 4,447,042 | 5/1984 | Masori | 187/8.43 |
| 4,724,930 | 2/1988 | VanLierp | 187/8.43 |
| 4,732,186 | 3/1988 | Nishikawa | 187/8.54 |

FOREIGN PATENT DOCUMENTS

1258575  11/1968  Fed. Rep. of Germany ..... 187/8.43

Primary Examiner—Robert P. Olszewski
Assistant Examiner—Kenneth Noland
Attorney, Agent, or Firm—Helfgott & Karas

[57] ABSTRACT

An automobile servicing apparatus includes a turntable which is rotatably supported and which is provided with a pair of retractable lift mechanisms. The turntable is also provided with a pair of storing spaces defined below its top surface for supporting thereon an automobile to be serviced. Each of the lift mechanisms is provided with a top flat plate which contacts the underside of the automobile when lifting and which is set in flush with the top surface of the turntable when set in its retracted position. Thus, there is provided a completely flat surface without any big holes when the lift mechanisms are set in their retracted position.

10 Claims, 11 Drawing Sheets

AUTOMOBILE SERVICING APPARATUS HAVING A TURNTABLE INCLUDING A RETRACTABLE LIFT

BACKGROUND OF THE INVENTION

1. Field of the Invention

This invention generally relates to an apparatus for servicing an automobile, and, in particular, to an automobile servicing apparatus having a turntable provided with a retractable lift for lifting an automobile to be serviced to a desired height up in the air.

2. Description of the Prior Art

Various types of apparatuses for servicing automobiles are known. Such automobile servicing apparatuses are installed, for example, at gas stations or automobile service stations for servicing automobiles, such as replacement of tires and inspection and adjustment of the steering system. In servicing automobiles, it is normally required to lift the automobile to be serviced up in the air to a desired height particularly when it is desired to check up the underside thereof, for example, for inspecting the steering system.

The present inventor invented an automobile servicing apparatus having a turntable which is provided with a gate-type lift and filed a patent application in the U.S.A. which has now issued as U.S. Pat. No. 4,732,186 on Mar. 22, 1988. The automobile servicing apparatus disclosed and claimed in that patent is advantageous in many respects over the prior art; however, it was designed to a turntable provided with a gate-type lift. Since the lift is provided as attached to the turntable, an automobile to be serviced may be lifted up in the air as desired and the full inspection and required operation may be carried out to the underside structure of the automobile. However, since the gate-type lift structure is rigidly attached to the turntable and it projects upward from the top surface of the turntable at its center, it also constitutes an obstruction to the mechanics. Moreover, since the gate-type lift structure defines the direction in which an automobile to be serviced can move on the turntable, there is a constraint in the direction of movement of an automobile on the turntable.

SUMMARY OF THE INVENTION

In accordance with the present invention, there is provided an automobile servicing apparatus including a turntable which is provided with a retractable lift structure for lifting an automobile to be serviced. In the preferred embodiment, the retractable lift structure is of the link type or pantagraph type and the lift structure is retracted in a storage space defined below the top surface of the turntable when not in use. As a result, when the lift structure is retracted, there is provided a substantially flat surface at the top surface of the turntable so that an automobile to be serviced may move in any desired direction thereon and there is present no obstruction to a mechanic.

It is therefore a primary object of the present invention to provide an improved automobile servicing apparatus which can provide a substantially flat top surface when a lift is not in use.

Another object of the present invention is to provide an improved automobile servicing apparatus including a turntable provided with a retractable lift structure for lifting an automobile to be serviced up in the air to a desired height.

A further object of the present invention is to provide an improved automobile servicing apparatus having a turntable provided a space for storing a retractable lift structure when not in use.

A still further object of the present invention is to provide an improved automobile servicing apparatus having a turntable which is sufficiently large to support thereon an automobile.

A still further object of the present invention is to provide an improved automobile servicing apparatus compact in size and high in convenience.

A still further object of the present invention is to provide an improved automobile servicing apparatus capable of providing an increased accessibility to an automobile to be serviced.

Other objects, advantages and novel features of the present invention will become apparent from the following detailed description of the invention when considered in conjunction with the accompanying drawings.

BRIEF DESCRIPTION OF THE DRAWINGS

FIG. 1b is a schematic illustration showing the arrangement of projections to define an anti-skid structure at the top surface of the turntable provided in the apparatus shown in FIG. 1a;

FIG. 1c is a schematic illustration showing a more detailed structure of each projection provided at the top surface of the turntable provided in the apparatus shown in FIG. 1a;

FIG. 2 is a schematic illustration showing in front view, partly in cross section, the overall structure of the apparatus shown in FIG. 1a;

DESCRIPTION OF THE PREFERRED EMBODIMENTS

Figure 1A:
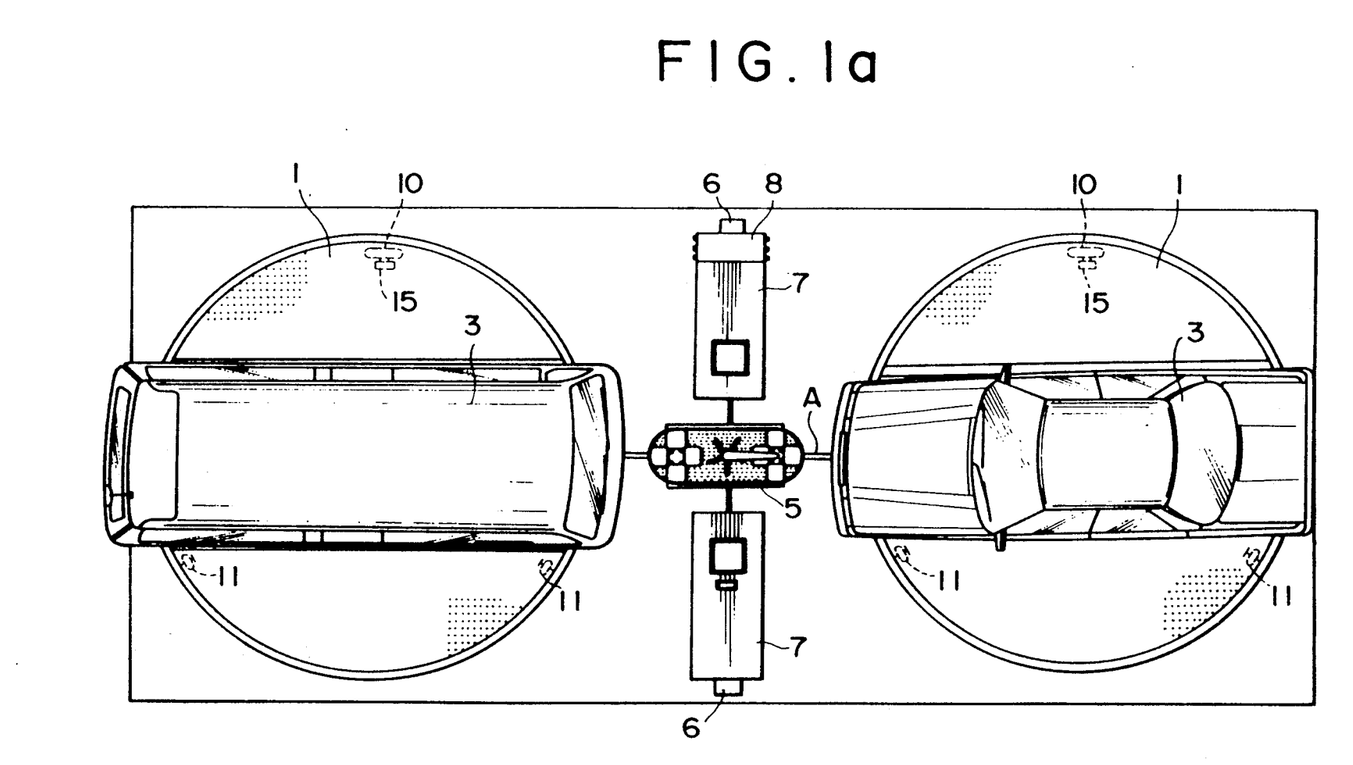
FIG. 1a is a schematic illustration showing in plan view the overall structure of an automobile servicing apparatus constructed in accordance with one embodiment of the present invention.
Figure 1B:
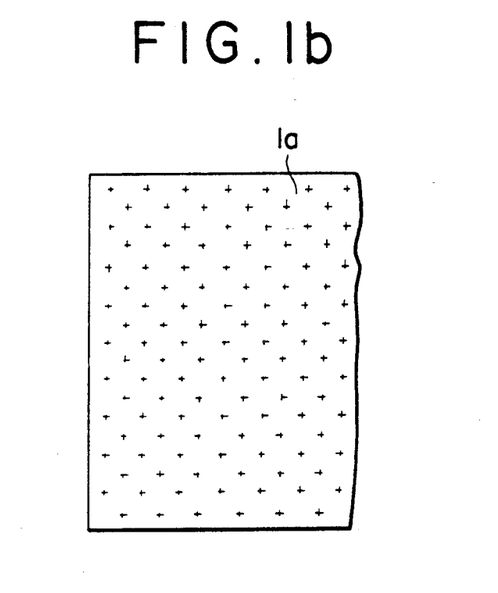
Figure 1C:
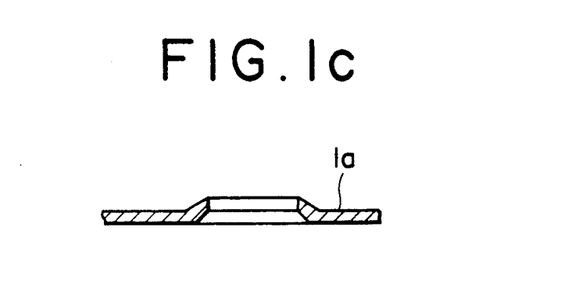
Figure 2:
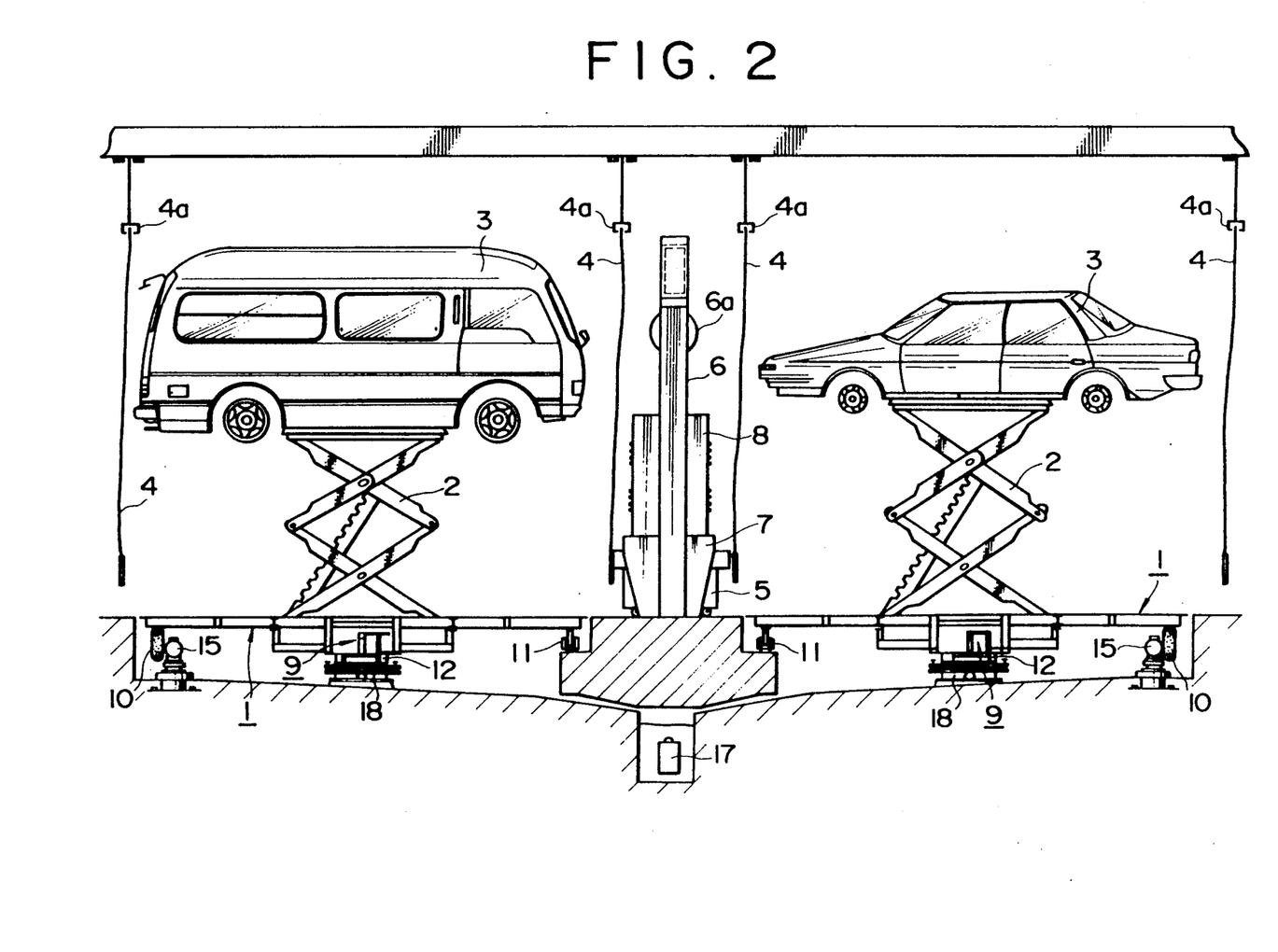
Figure 3:
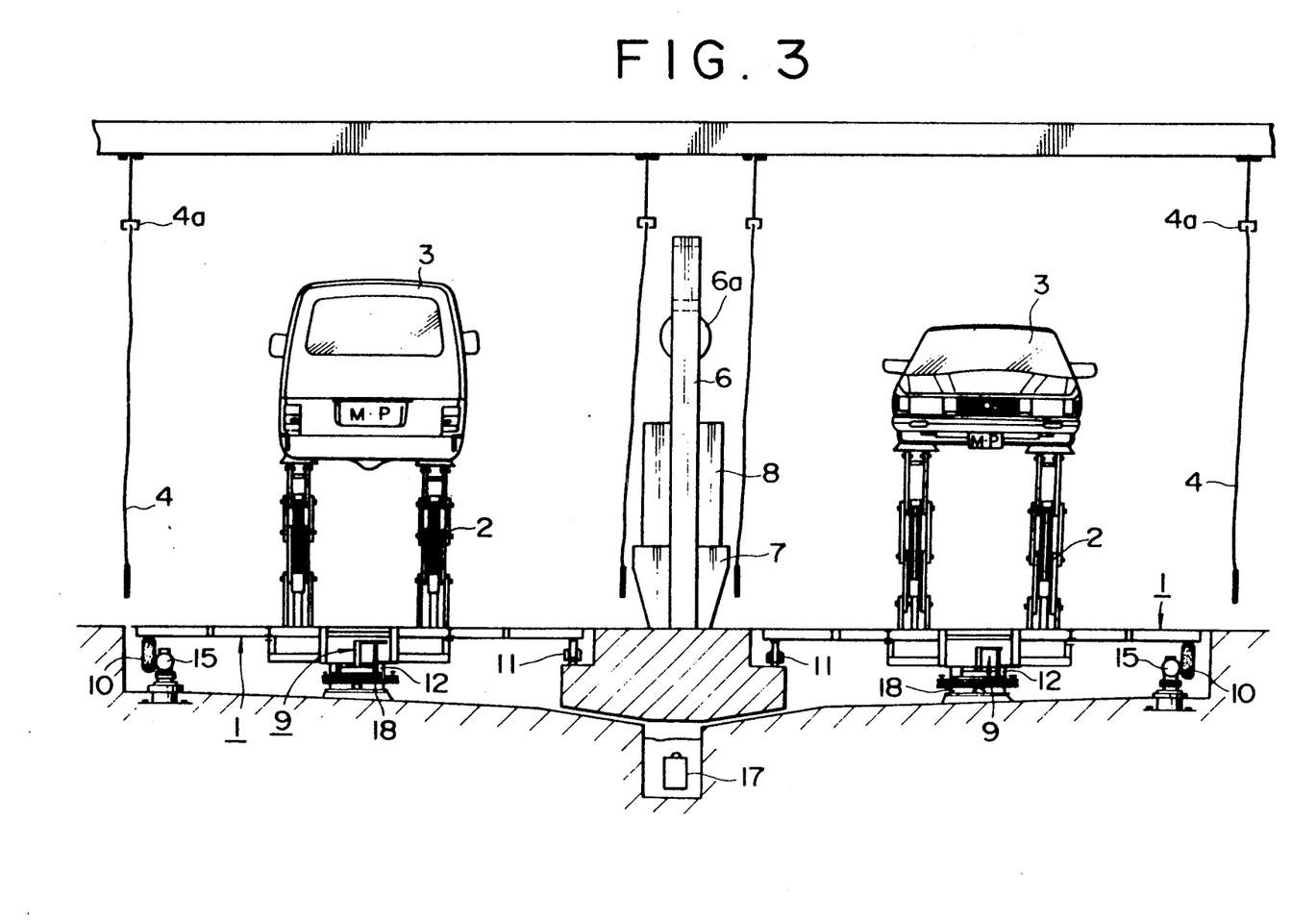
FIG. 3 is a schematic illustration showing in side view, partly in cross section, the overall structure of the apparatus shown in FIG. 2.

Referring first to FIGS. 1 through 3, there is schematically shown an automobile servicing apparatus constructed in accordance with one embodiment of the present invention. In the illustrated embodiment, there is provided a pair of turntables 1; however, the illustrated apparatus is fundamentally symmetrical in structure, only one of the turntables 1 will be described in detail below.

As shown, in the present embodiment, the turntable 1 has a diameter which is sufficiently large to support an automobile to be serviced. However, if desired, the turntable 1 may be sized to support two or more automobiles to be serviced. The turntable 1 may be rotatably installed in a pit formed in the floor of an automobile service station, such as a gas station. In the preferred embodiment, the turntable 1 has a top surface having an anti-skid structure for preventing an automobile to be serviced from sliding on top of the turntable 1. In the illustrated embodiment, as shown in FIG. 1b, a number of upward projections 1a are provided uniformly at the surface of a top plate which defines the top surface of the turntable 1. Because of these upward projections 1a, an automobile 3 is prevented from sliding when supported on the turntable 1. FIG. 1c illustrates the detailed structure of one such upward projection 1a. It is to be noted that a through-hole is provided at each upward projection 1a so that any water after being used for washing the underside structure of the automobile 1 may pass through the hole and into the pit. Such a structure is advantageous because it helps to keep the top surface of the turntable 1 free of water because it also serves for footing for mechanics.

The turntable 1 is supported to be rotatable around a center base 18 which is fixedly provided at the bottom of the pit. As will become more clear later, a bearing 12 is provided between the center base 18 and the turntable 1 so that the turntable 1 may rotate in any direction around the center of the center base 18 when a rotating force is applied to the turntable 1. In the illustrated embodiment, a drive unit 15 having a drive motor is fixedly provided at the bottom of the pit and near the periphery of the turntable 1. The drive unit 15 has a drive wheel 10 which preferably comprised of an automobile wheel and which is operatively coupled to the motor of the drive unit 15. The drive unit 15 includes a height adjusting mechanism 15a so that the position of the drive wheel 10 may be suitably adjusted relative to the turntable 1. As best shown in FIG. 5b, a drive path strip 1b is fixedly attached to the bottom of the turntable 1, and the drive wheel 10 is in rolling contact with the drive path strip 1b. Thus, when the drive unit 15 is activated, the drive wheel 10 is driven to rotate, which in turn causes the turntable 1 to rotate around the center base 18. It should be noted that such drive unit 15 having the drive wheel 10 may be provided as many as possible spaced apart in the circumferential direction.

Also provided as fixedly attached to the bottom of the pit are a plurality of support rollers 11 as best shown in FIGS. 1a and 5b. The support rollers 11 are preferably arranged spaced apart from one another in the circumferential direction and in rolling contact with the drive path strip 1b. In the illustrated embodiment, only one of the drive unit 15 having the drive wheel 10 and two of the support rollers 11 are provided as spaced apart from one another over 120° in the circumferential direction. However, any desired number of drive units 5 and support rollers 11 may be provided, depending on the size and capacity of the turntable 1.

Figure 5A:
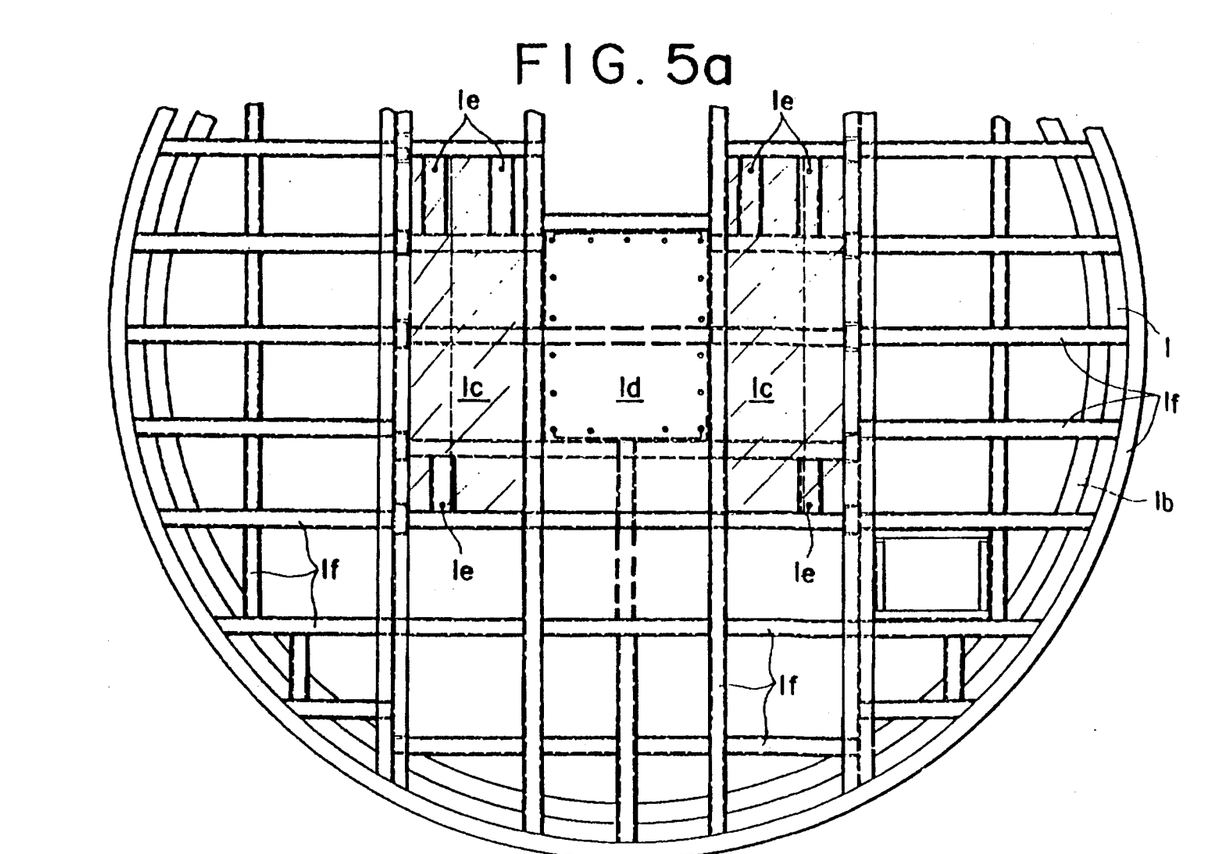
FIG. 5a is a schematic illustration showing in plan view the internal structure of the turntable provided in the apparatus shown in FIGS. 1 through 3.
Figure 5B:
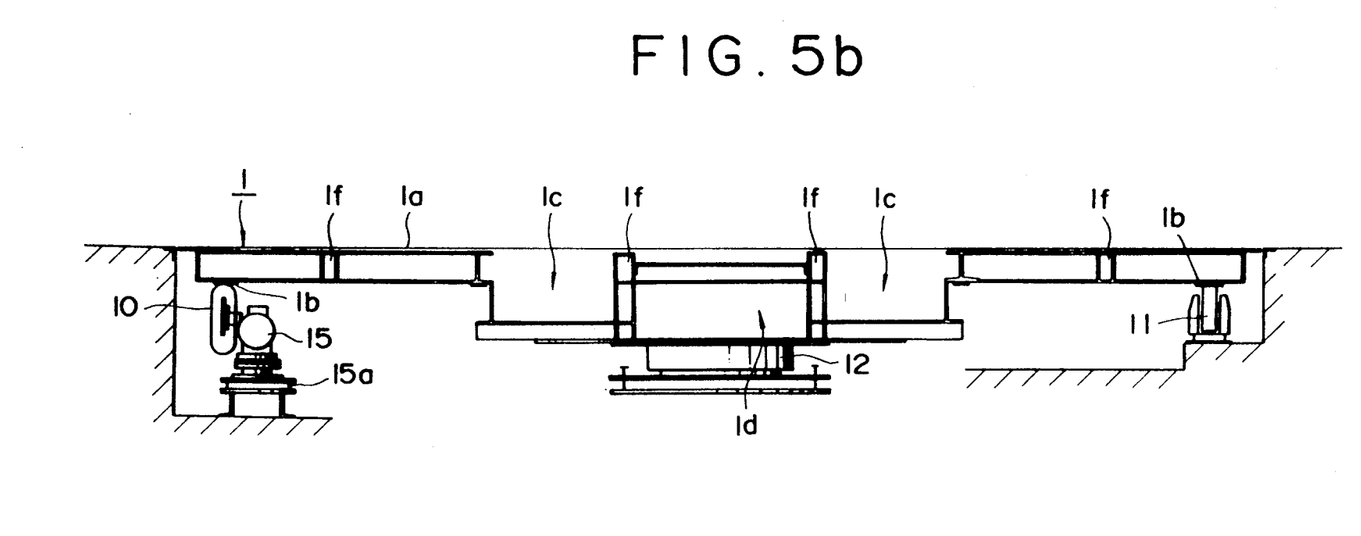
FIG. 5b is a schematic illustration showing how the turntable of the present apparatus may be provided in a pit formed in a floor of an automobile service station.

As best shown in FIGS. 5a and 5b, the basic structure of the turntable 1 is comprised of an assembly of steel beams 1f having desired shapes. A flat steel plate having an anti-skid structure as described before and having a desired shape is fixedly attached to the top of the steel beam assembly to provide a top surface of the turntable 1. The top plate is provided with at least two rectangular slots 1c and 1c, as indicated in FIG. 5a. And, the turntable 1 is provided with a pair of storing spaces for storing therein a pair of retractable lifts 2. Described more in detail, the turntable 1 is provided with a pair of retractable lifts 2 for lifting the automobile 3 in service up in the air to a desired height from the top surface of the turntable 1. In the present invention, the lift 2 has a retractable structure and it is preferably of the link type or pantagraph type, so that the lift 2 may be folded into the corresponding storing space when retracted. The lift 2 has a rectangular top plate which may serve to support the underside structure of the automobile 3 in service when advanced upward and which also serve to plug the slot defined in the top surface of the turntable 1 so that there is provided a substantially flat surface without holes when the lifts 2 are moved back to their retracted position. Such a structure is particularly advantageous because the automobile in service 3 may be lifted up in the air to a desired height because of the provision of the lifts 2 and the automobile 3 may be driven in any desired direction after service because of absence of any obstruction on the turntable when the lifts 2 are moved back to their retracted position.

As shown in FIGS. 5a and 5b, the turntable 1 is provided with a pair of lift storing spaces 1c, 1c which are spaced apart from each other over a desired distance symmetrically with respect to the center of the turntable 1. Each of the lift storing spaces 1c, 1c is generally rectangular in shape in the illustrated embodiment and has a size sufficient for receiving therein the corresponding lift 2 when folded to its retracted position. When the lift 2 is set in its retracted position, its top plate is located substantially flash with the top surface of the turntable 1 so that there is provided a flat top surface without holes. In FIG. 5a, mounting holes 1e for mounting retractable lifts 2 in respective lift storing spaces 1c, 1c are also shown. The lift storing spaces 1c, 1c are shown as shaded areas in FIG. 5a. Thus, each of the shaped areas correspond to the top plate of the lift 2 so that this portion may move upward when the lift 2 is advanced and may move downward to define a part of the top surface of the turntable 1 when the lift 2 is moved back to its retracted position.

The turntable 1 is also provided with a center internal chamber 1d which is located between the pair of lift storing spaces 1c, 1c. As will become more clear later the center chamber 1d is provided to receive therein a rotary connector 9 which provides an operative connection between a power source which is provided stationarily, for example, on the floor of the service station and each of the retractable lifts 2.

In an automobile servicing system shown in FIGS. 1 through 3, a pair of automobile servicing apparatus having the structure as described above is provided. In the illustrated system, two turntables 1 are spaced apart from each other sufficiently so that each of the turntables 1 may support thereon any desired automobile 3 without interference with the other. A straight guide path A extends between the two turntables 1 and a washing liquid spraying and drying unit or washer unit 5 is provided to be in engagement with the guide path A. Although not shown specifically, it is to be noted that a corresponding guide path portion is provided in each of the turntables 1 so that when each of the turntables 1 is set in its predetermined rotary position, the guide path A is aligned with the corresponding guide path portion of the turntable 1. Accordingly, under the circumstances, when the washer unit 5 is activated, the washer unit 5 may travel along the aligned guide path to move under the automobile 3 lifted by the lifts 2 so that washing liquid may be sprayed onto the underside of the automobile 3 to have its underside washed. After having been sprayed onto the underside of the automobile 3, the washing liquid drips from the automobile 5 down to the turntable 1. However, as described previously, since the turntable 1 is provided with a number of holes at projections 1a, the washing liquid may pass through these holes down into the pit. As a result, the top surface of the turntable 1 which provides a footing for mechanics may be kept dry as much as possible. In the illustrated system having a pair of servicing apparatuses, there is provided a common pit so that the bottom of each half of the common pit is inclined toward the center so that the washing liquid may be collected at the center where a drain pump 17 is provided.

Figure 4A:
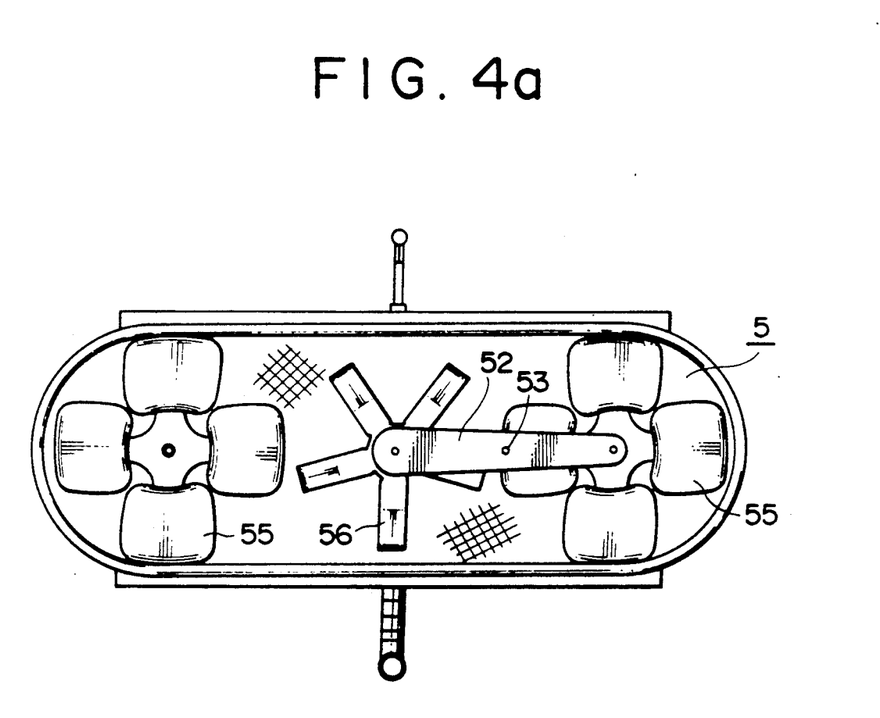
FIGS. 4a through 4c are schematic illustrations showing the detailed structure of a washing liquid spraying unit which may be advantageously provided in the apparatus shown in FIGS. 1 through 3.
Figure 4B:
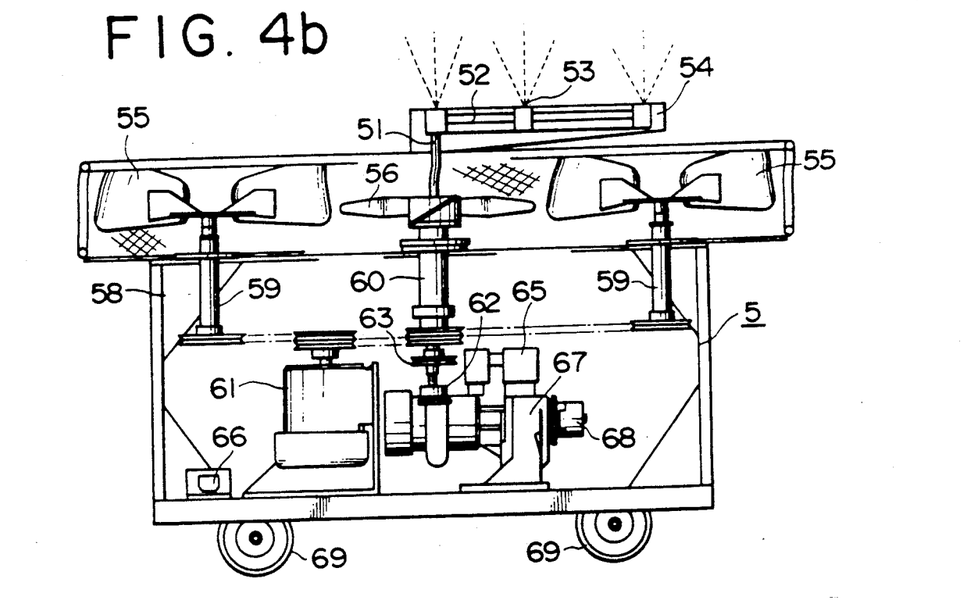
Figure 4C:
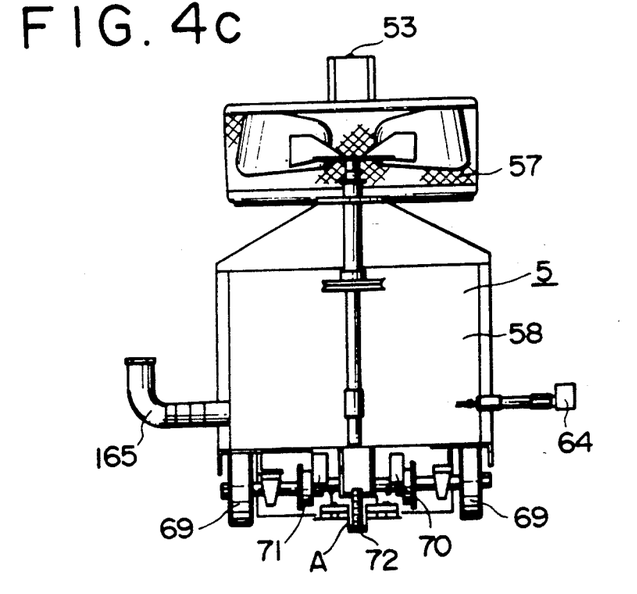

Although any desired unit may be used for the washer unit 5, the detailed structure of one preferred embodiment for use in the present automobile servicing apparatus is shown in FIGS. 4a through 4c. As shown, the washer unit 5 includes a hollow, rotary center shaft 51 which is located approximately at the center and extends vertically and a hollow arm pipe 52 which extends horizontally from the top end of the shaft 51. When the shaft 51 is driven to rotate, the arm 51 rotates with its one end as a center. The arm pipe 52 is provided with three nozzles 53 at spaced intervals for spraying washing liquid upward, and the arm pipe 52 is also provided with a cover to enclose the arm pipe 52 and the nozzles 53 excepting the openings of the nozzles 53.

Also provided in the washer unit 5 is a pair of side fans 55, 55 which are disposed on opposite sides of the center shaft 51 facing upward. A center fan 56 is also provided with its rotating axis in alignment with the rotating axis of the center shaft 51. All of these fans 55 and 56 are disposed below the arm pipe 52 so that they do not get in the way of the rotary or swing movement of the arm pipe 52. All of these fans 55 and 56 are enclosed by a protective net 57. When the fans 55 and 56 are driven to rotate, the air is sucked from the side and ejected upward. The washer unit 5 also includes a frame 58 which houses therein various components and which also supports side fan shafts 59 and a center fan shaft 60. Each of the fan shafts 59 and 60 is driven to rotate by a fan motor 61 housed in the frame 58 through a power transmission system including belts and pulleys. The center rotary shaft 51 extends through the center fan shaft 60 and has its bottom end connected to a high pressure rotor joint 62. The center rotary shaft 51 is driven to rotate by an arm drive motor 63.

The washer unit 5 is also provided with a swivel joint 64 for receiving hot water supplied there to through a hose (not shown) connected thereto. The hot water thus supplied passes through a high pressure electromagnetic valve 65 to the high pressure rotor joint 62, from where the hot water is sprayed from the nozzles 53 after passing through the hollow center shaft 51 and the arm pipe 52. The washer unit 5 is also provided with another swivel joint 165 for electrical connections and a joint box 66. A geared motor 67 is mounted as housed in the frame 58 for driving wheels 69 through a power transmission system including a clutch 68 and a chain. Thus, when the wheels 69 are driven, the washer unit 5 may travel forwardly or backwardly depending on the direction of rotation.

Also provided in the washer unit 5 are a pair of limit switches 70, 71 and a guide roller 72 which is provided to extend downward at the center of the frame 58. When the washer unit 5 is set in position, the guide roller 72 is brought into engagement with the guide path A so that the washer unit 5 may travel either forwardly or backwardly as guided by the guide path A when the wheels 69 are driven to rotate. When the limits switches 70, 71 are brought into contact with dogs (not shown) disposed in the vicinity of the guide path A as the washer unit 5 approaches a limit of movement, the wheels 69 are driven to rotate in the reversed direction so that the washer unit 5 may travel back and forth between two limits of movement. As briefly described previously, an extension of the guide path A is provided correspondingly in each of the turntables 1. Thus, when the turntable 1 is set in a predetermined position in which the extension of the guide path A provided in the turntable 1 is in alignment with the guide path A, the washer unit 5 may travel under the automobile in service 3 which is lifted up in the air by the lifts 2 so as to spray washing liquid toward the underside structure of the automobile 3 to have the underside structure washed. Besides, since the fans 55 and 56 are provided in the washer unit 5, the underside structure of the automobile 3 may be dried after washing.

Figure 6A:
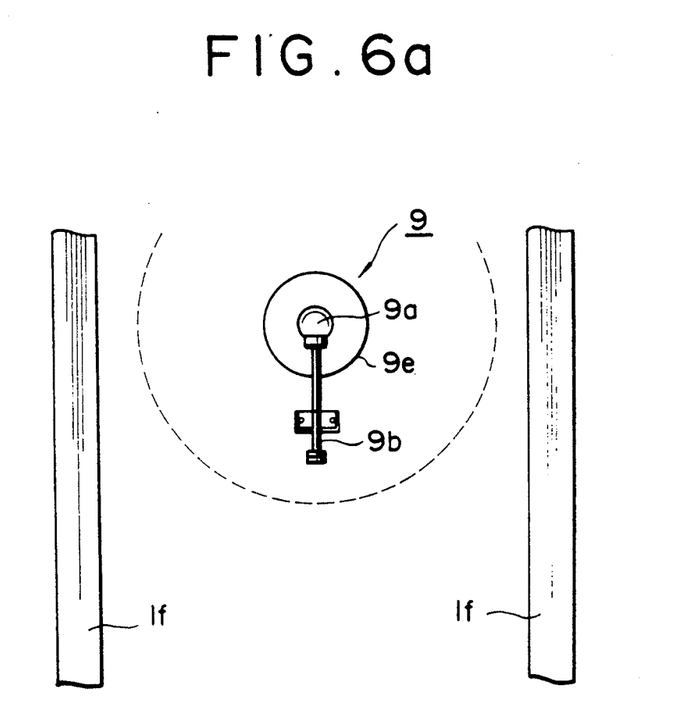
FIGS. 6a and 6b are schematic illustrations showing the positional relationship between a rotary connector 9 for providing an operative coupling between the stationary source and the retractable like mechanism and the turntable 1.
Figure 6B:
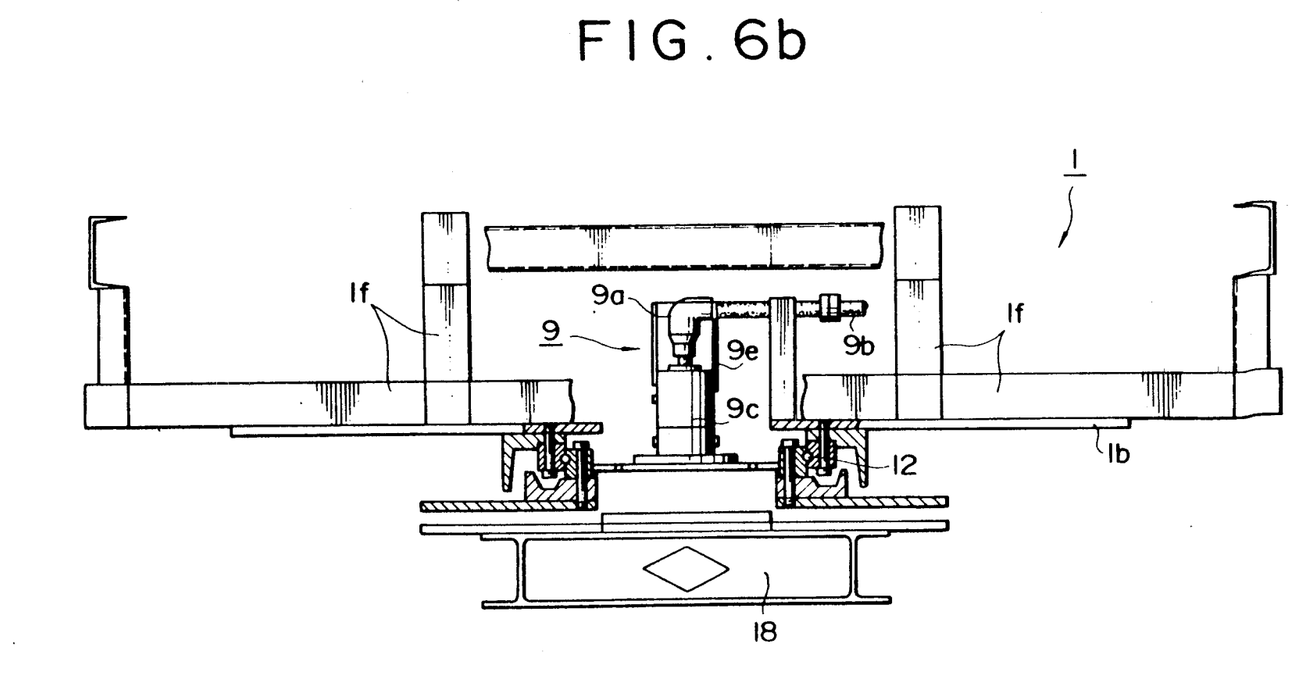

As described previously, in accordance with the present invention, a retractable lift mechanism 2 is provided in the turntable 1 and the lift mechanism 2 may be moved back to its retracted position below the top surface of the turntable 1. Since the turntable 1 is rotatably supported, there must be provided some means for supplying a power to operate the lift mechanism 2. For this purpose, in accordance with the preferred embodiment of the present invention, a rotary connection unit 9 is provided at the center of and below the turntable 1. In the illustrated embodiment, use is made of a pressurized oil as a working fluid for operating the lift mechanism 2. As best shown in FIGS. 6a and 6b, the rotary connection unit 9 is fixedly mounted on the center base 18 which in turn is fixedly mounted on the bottom of the pit. The rotary connection unit 9 includes a stationary core shaft 9f which is fixedly attached to the center base 18. The rotary connection unit 9 also includes a rotary joint 9a which is rotatably mounted on the core shaft 9f, and a horizontal pipe 9b is connected to the rotary joint 9a. A hose or the like may be connected to the horizontal pipe and the other end of the hose may be connected to the corresponding lift mechanism 2. Thus, a working fluid under pressure may be supplied to the corresponding lift mechanism 2 through a center hole provided in the stationary core shaft 9f, the rotary joint 9a, and the horizontal pipe 9b.

Figure 7:
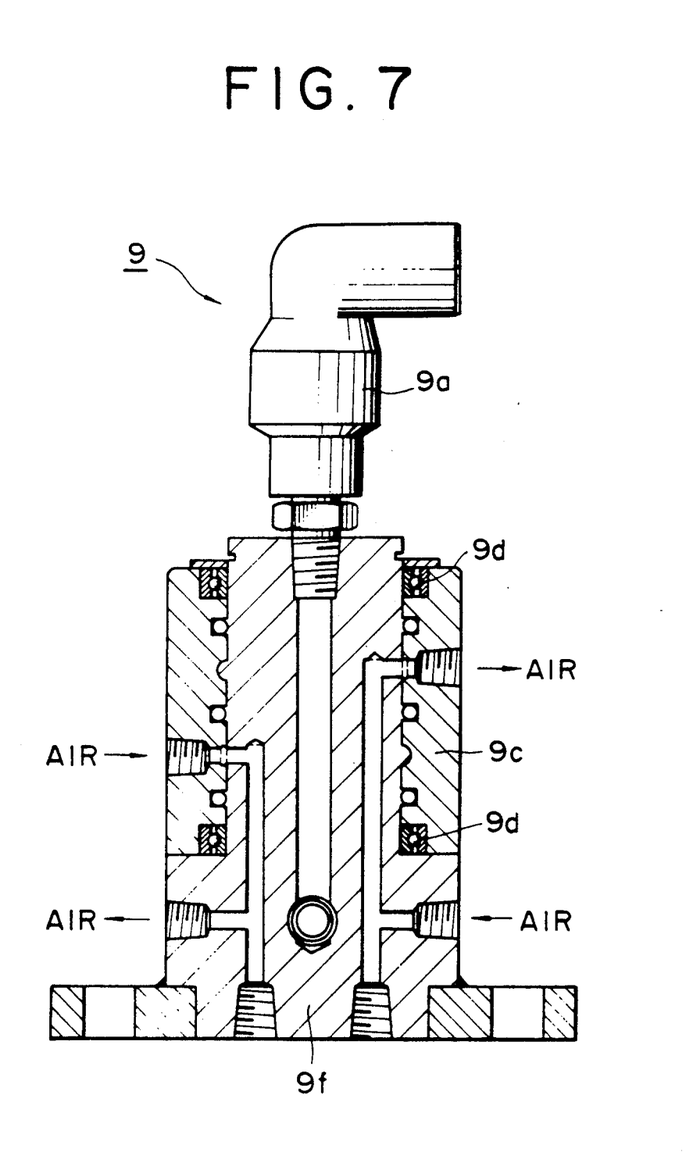
FIG. 7 is a schematic illustration showing the detailed structure of the rotary connector 9.

As best shown in FIG. 7, the rotary connection unit 9 also includes a rotary collar 9c which is fitted onto the stationary center core shaft 9f with a pair of bearings 9d, 9d sandwiched therebetween. Thus, the collar 9c may rotate relative to the center core shaft 9f. A support cylinder 9c is also provided and it is partly fitted onto the collar 9c at its bottom and it supports the horizontal pipe 9b. The horizontal pipe 9b is also supported at its middle by a stem which constitutes a part of the turntable 1. The center hole of the core shaft 9f is in communication with an outside power source, such as a pump for supplying a working fluid under pressure. As described above, since the power source and the lift mechanisms 2 are operatively coupled through the rotary connection unit 9, such an operative connection is suitably maintained even if the turntable 1 rotates. Thus, it is clear that the power source, such as a pump and a reservoir of working fluid, which is located, for example, on the floor of a service station, is always in communication with the lift mechanisms 2 mounted on the turntable 1. Therefore, the operation of the lift mechanisms 2 may be controlled remotely. Also shown in FIG. 7 are air passages provided in the rotary connection unit 9. In the present embodiment, these air passages are used for an air safety lock mechanism (not shown) provided in the lift mechanisms 2.

Also shown in FIGS. 1 through 3 includes a gate type structure 6 including a pair of vertical columns and a horizontal beam which extends between the tops of the pair of vertical columns. One or more reels 6a are rotatably supported on the gate type structure 6 for winding hoses or wires or the like, which are to be used for servicing the automobile 3. A pair of desks 7 is provided and they may be used as work benches. A control panel 8 is provided at one end of each of the desks 7 so that the operation of the present automobile servicing apparatus may be controlled by operating the control panel 8. For example, the rotation of the turntable 1 and operation of the lift mechanisms 2 may be controlled through the control panel 8. As best shown in FIGS. 2 and 3, a curtain 4 may preferably be provided as hanging from a curtain rail 4a which may be supported at the ceiling of the service station.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An automobile servicing apparatus comprising:
   a rotatably supported turntable including a storing space which is defined below a top surface of said turntable on which an automobile to be serviced may be supported;
   a retractable lift means mounted on said turntable, said lift means lifting said automobile to be serviced to a desired height above the top surface of said turntable when advanced and being received completely in said storing space of said turntable when set in its retracted position, thereby providing a substantially flat top surface without any big holes at the top surface of said turntable;
   first driving means for driving to rotate said turntable in a desired direction; and
   second driving means for driving to operate said retractable lift means,
   said second driving means including a power source provided outside of said turntable and a rotary connection unit which establishes an operative connection between said power source and said lift means.

2. The apparatus of claim 1, wherein said rotary connection unit is disposed at the center of and below said turntable and said rotary connection unit is received in an internal chamber defined at the center of and below the top surface of said turntable.

3. The apparatus of claim 1, wherein said lift means includes a pair of lift mechanisms which are spaced apart from each other over a predetermined distance and mounted on said turntable symmetrically with respect to its center.

4. The apparatus of claim 3, wherein each of said lift mechanisms has a flat top plate which may be brought into contact with the underside of the automobile to be serviced when lifting said automobile and which may constitute a part of the top surface of said turntable when set in its retracted position.

5. The apparatus of claim 3, wherein each of said lift mechanisms is of a link or pantagraph type.

6. The apparatus of claim 1, wherein said turntable has an anti-skid surface structure at least partly.

7. The apparatus of claim 6, wherein said anti-skid structure includes a plurality of upward projections.

8. The apparatus of claim 1, wherein said turntable is provided with a plurality of small through-holes so as to allow water to pass through.

9. The apparatus of claim 1, wherein said first driving means includes a drive wheel in rolling contact with said turntable to cause said turntable to rotate.

10. The apparatus of claim 1, further comprising supporting means for rotatably supporting said turntable, said supporting means including a plurality of rollers which are arranged circumferentially to support said turntable at a plurality of points.

* * * * *